United States Patent
Kayama et al.

(10) Patent No.: US 10,217,452 B2
(45) Date of Patent: Feb. 26, 2019

(54) SPEECH SYNTHESIS DEVICE AND METHOD

(71) Applicant: Yamaha Corporation, Hamamatsu-shi, Shizuoka-Ken (JP)

(72) Inventors: Hiraku Kayama, Hamamatsu (JP); Hiroaki Matsubara, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 15/491,414

(22) Filed: Apr. 19, 2017

(65) Prior Publication Data

US 2017/0221470 A1 Aug. 3, 2017

Related U.S. Application Data

(63) Continuation of application No. PCT/JP2015/079594, filed on Oct. 20, 2015.

(30) Foreign Application Priority Data

Oct. 20, 2014 (JP) .................................. 2014-213852

(51) Int. Cl.
*G10L 15/00* (2013.01)
*G10L 13/033* (2013.01)
(Continued)

(52) U.S. Cl.
CPC ...... *G10L 13/0335* (2013.01); *G10L 21/0364* (2013.01); *G10L 25/90* (2013.01); *G10L 15/22* (2013.01)

(58) Field of Classification Search
CPC ........ G10L 13/08; G10L 13/10; G10L 15/265
USPC ........................................................ 704/275
See application file for complete search history.

(56) References Cited

U.S. PATENT DOCUMENTS

| | | | |
|---|---|---|---|
| 9,330,720 B2 * | 5/2016 | Lee | G11B 20/10527 |
| 2004/0002853 A1 * | 1/2004 | Clavbo | G10L 17/26 704/205 |

(Continued)

FOREIGN PATENT DOCUMENTS

| | | |
|---|---|---|
| JP | 62-115199 A | 5/1987 |
| JP | 2001-242881 A | 9/2001 |

(Continued)

OTHER PUBLICATIONS

International Search Report (PCT/ISA/210) issued in PCT Application No. PCT/JP2015/079594 dated Dec. 8, 2015 with English translation (four pages).

(Continued)

*Primary Examiner* — Daniel Abebe
(74) *Attorney, Agent, or Firm* — Crowell & Moring LLP

(57) ABSTRACT

This invention is an improvement of technology for automatically generating response voice to voice uttered by a speaker (user), and is characterized by controlling a pitch of the response voice in accordance with a pitch of the speaker's utterance. A voice signal of the speaker's utterance (e.g., question) is received, and a pitch (e.g., highest pitch) of a representative portion of the utterance is detected. Voice data of a responsive to the utterance is acquired, and a pitch (e.g., average pitch) based on the acquired response voice data is acquired. A pitch shift amount for shifting the acquired pitch to a target pitch having a particular relationship to the pitch of the representative portion is determined. When response voice is to be synthesized on the basis of the response voice data, the pitch of the response voice to be synthesized is shifted in accordance with the pitch shift amount.

17 Claims, 6 Drawing Sheets

(51) Int. Cl.
*G10L 25/90* (2013.01)
*G10L 21/0364* (2013.01)
*G10L 15/22* (2006.01)

(56) References Cited

U.S. PATENT DOCUMENTS

| | | | |
|---|---|---|---|
| 2004/0148172 A1 | 7/2004 | Cohen et al. | |
| 2004/0193421 A1 | 9/2004 | Blass | |
| 2006/0106603 A1 | 5/2006 | Boillot et al. | |
| 2007/0208566 A1* | 9/2007 | En-Najjary | G10L 13/033 704/269 |
| 2007/0233492 A1 | 10/2007 | Matsumoto | |
| 2009/0177300 A1* | 7/2009 | Lee | G11B 20/10527 700/94 |
| 2012/0095767 A1* | 4/2012 | Hirose | G10L 13/033 704/258 |

FOREIGN PATENT DOCUMENTS

| | | |
|---|---|---|
| JP | 2003-271194 A | 9/2003 |
| JP | 2004-347653 A | 12/2004 |
| JP | 2005-221785 A | 8/2005 |
| JP | 2007-271910 A | 10/2007 |
| JP | 2008-139631 A | 6/2008 |
| JP | 4495907 B2 | 7/2010 |
| JP | 4832097 B2 | 12/2011 |
| JP | 2012-2856 A | 1/2012 |

OTHER PUBLICATIONS

Japanese-language Written Opinion (PCT/ISA/237) issued in PCT Application No. PCT/JP2015/079594 dated Dec. 8, 2015 (four pages).
Extended European Search Report issued in counterpart European Application No. 15852291.2 dated May 17, 2018 (nine pages).
Watanabe, "Effects of Pitch Adaptation in Prosody on Human-Machine Verbal Communication", Advances in Human Factors/ Ergonomics, Jan. 1, 1995, pp. 269-274, vol. 20, Elsevier Science B.V., eight pages.
Japanese-language Office Action issued in counterpart Japanese Application No. 2014-213852 dated Jul. 3, 2018 with unverified English translation (11 pages).

* cited by examiner

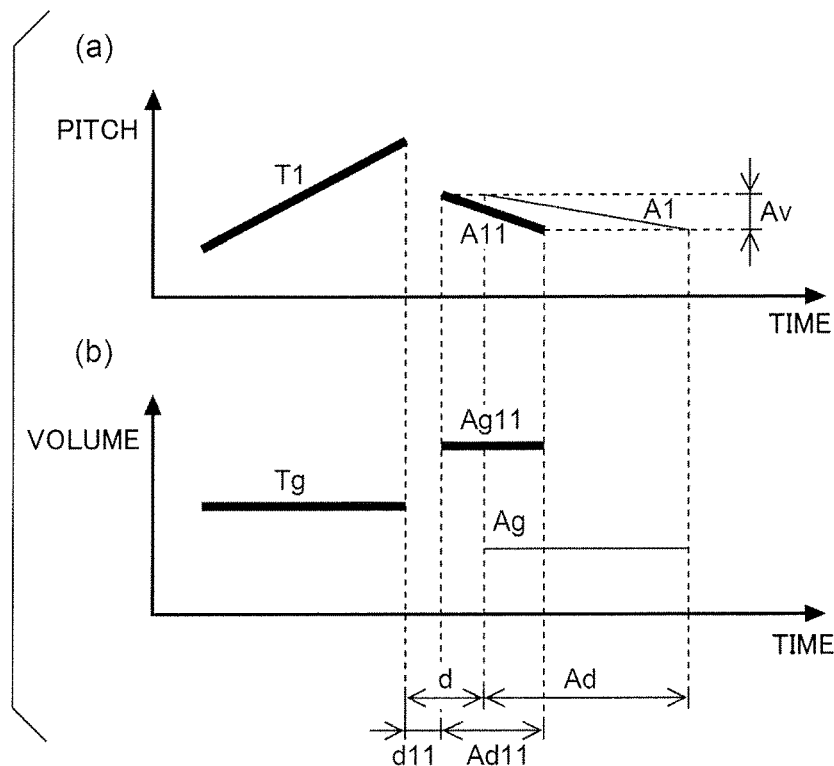
F I G. 6
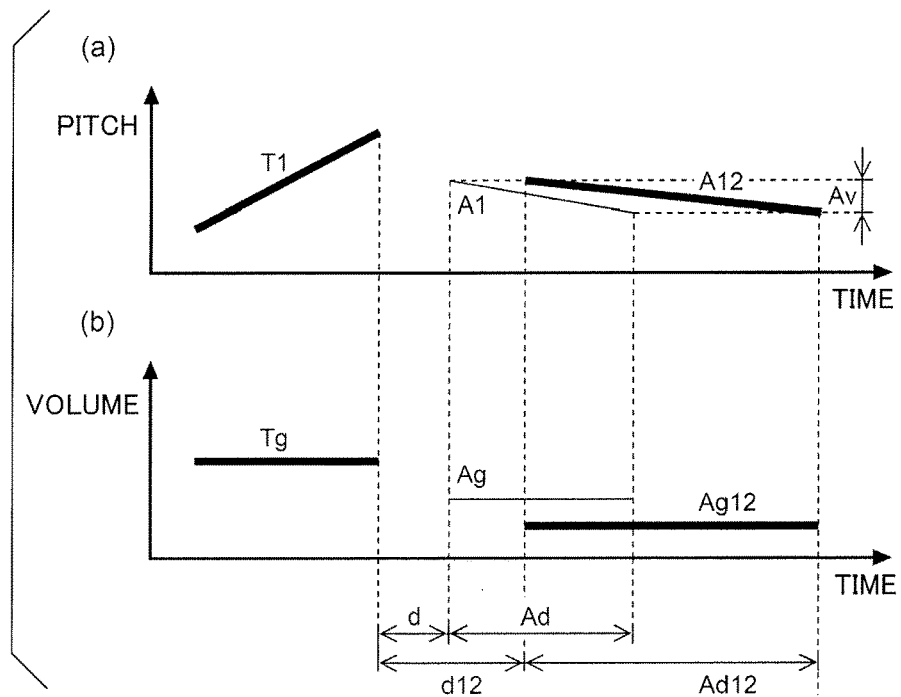
F I G. 7

SPEECH SYNTHESIS DEVICE AND METHOD

TECHNICAL FIELD

The present invention relates to a speech synthesis device and method and a program for performing the speech synthesis method.

BACKGROUND ART

In recent years, the following voice or speech synthesis techniques have been proposed. Such proposed voice or speech synthesis techniques include a technique that synthesizes and outputs voice corresponding to a speaking tone and voice quality of a user and thereby generates voice more like real human voice (see, for example, Patent Literature 1), and a technique that analyzes voice of a user to evaluate psychological and health conditions etc. of the user (see, for example, Patent Literature 2). Also proposed in recent years is a voice interaction system which implements voice interaction with a user by outputting, in synthesized voice, content designated by a scenario while recognizing voice input by the user (see, for example, Patent Literature 3).
Patent Literature 1: Japanese Patent Application Laid-open Publication No. 2003-271194
Patent Literature 2: Japanese Patent NO. 4495907
Patent Literature 3: Japanese Patent NO. 4832097

Let's now assume an interaction system which combines the aforementioned speech synthesis technique and the voice interaction system, and which outputs, to a question given by voice of a user, a response in voice synthesized through voice or speech synthesis. Such an assumed interaction system, however, may sometimes give the user a feeling as if a machine were speaking the response.

SUMMARY OF THE INVENTION

In view of the foregoing, it is therefore an object of the present invention to provide a speech synthesis device and a speech synthesis method which can automatically synthesize voice responsive to a question without giving an unnatural feeling to a user and while preventing deterioration of auditory quality of the voice, as well as a storage medium storing a program for implementing such a speech synthesis method.

In developing a man-machine system that outputs, through voice or speech synthesis, a response to a question given by a user, consideration is first given about what kind of dialogue is carried out between persons, focusing on information other than linguistic information, particularly sound pitches (frequencies) characterizing the dialogue. As an example dialogue between persons, a case is considered in which one person ("person b") responds to an utterance (e.g., question) given by another person ("person a"). In such a case, when "person a" has uttered a question, not only "person a" but also "person b" often has a strong impression of a pitch in a particular portion of the question. When "person b" responds to the question with an intention of agreement, approval, affirmation or the like, "person b" utters voice of a response (response voice) in such a manner that a pitch of a portion characterizing the response has a particular relationship, more specifically a consonant-interval relationship, to the above-mentioned impressing pitch (having given the strong impression to the person). Because the impressing pitch of the question of "person a" and the pitch of portion characterizing the response of "person b" are in the above-mentioned relationship, "person a" having heard the response may have a good, comfortable and reassuring impression on the response of "person b". Namely, it can be considered that, in an actual dialogue between persons, a pitch of a question and a pitch of a response to the question have a particular relationship as noted above rather than being unrelated to each other. Thus, in order to accomplish the above-mentioned object in light of the aforementioned consideration, the inventors of the present invention have developed an interaction system in the form of a speech synthesis device which is constructed in the following manner to output, through voice or speech synthesis, a response to a question given by a user.

Namely, in order to accomplish the above-mentioned object, the present invention provides an improved speech synthesis device, which comprises: a reception section that receives a voice signal of an utterance; a pitch detection section that, based on the voice signal received by the reception section, detects a pitch of a representative portion of the utterance; a response acquisition section that acquires voice data of a response to the utterance; a response pitch acquisition section that acquires a pitch based on the voice data of the response acquired by the response acquisition section; a pitch shift amount determination section that determines a pitch shift amount for shifting the pitch acquired by the response pitch acquisition section to a target pitch having a particular relationship to the pitch of the representative portion; and a response synthesis section that synthesizes voice of the response based on the voice data of the response, the response synthesis section being configured to shift, in accordance with the shift amount, a pitch of the voice of the response to be synthesized.

According to the present invention, a pitch of a representative portion of a received utterance is detected, a pitch shift amount is determined in accordance with a target pitch having a particular relationship to the detected pitch of the representative portion, and then a pitch of voice of a response to be synthesized is shifted in accordance with the determined pitch shift amount. Thus, the present invention can synthesize voice of a response to voice of the received utterance (e.g., a question uttered by a user) with a pitch having a particular relationship to the pitch of the utterance (question). In this way, the present invention can synthesize (reproduce) response voice that is not unnatural and is high in quality. Note that, in the present invention, a voice signal of the utterance received from a speaker (user) represents linguistic voice of one sentence, one or a few phrases, one voice, or the like.

Also note that the above-mentioned response is not necessarily limited to a specific response to the content of the utterance (question). Examples of the response may include just backchannel feedback (interjection) and crying voice of animals, such as "bowwow" and "meow", in addition to human voice. Namely, the terms "response" and "voice" refer to concepts including not only human-uttered voice but also crying voice of animals.

Further, the "pitch of a representative portion of a received utterance" refers to a pitch representing pitch-related features and characteristics of the received utterance. For example, the "pitch of a representative portion of a received utterance" is a pitch of a portion of the utterance that strongly impresses listeners with the purport or intention of the utterance; specifically, it may be the highest pitch in a portion of the utterance where volume is of a predetermined value or over, or a pitch in a trailing end portion of the utterance (question).

Furthermore, the "pitch based on the voice data of the response" that is acquired by the pitch acquisition section may be a pitch in a characteristic portion of the response when the voice data of the response is reproduced in a standard pitch range, and the "pitch in a characteristic portion" may, for example, be a pitch in a beginning portion of the response, a pitch in a portion of the response where volume is the highest, an average pitch of the response, or the like.

In one embodiment of the invention, the pitch shift amount determination section may determine, as the target pitch, a pitch having a consonant-interval relationship to the pitch of the representative portion. "consonant interval" refers to a relationship where a plurality of tones having been simultaneously generated mix with each other to well harmonize with each other, and such an interval relationship between the tones is referred to as "consonant-interval relationship". The simpler a frequency ratio between two tones is, the higher is a degree of consonance between the tones.

In one embodiment of the invention, the pitch shift amount determination section may determine the target pitch such that the target pitch falls within a predetermined range from the acquired pitch. In the case where the voice data is shifted by the pitch shift amount, quality of the pitch-shifted voice data would deteriorate in quality if the pitch shift amount is great. However, the present invention can avoid such deterioration by determining the target pitch such that the target pitch falls within a predetermined range from the acquired pitch. In one embodiment, the pitch shift amount determination section may adjust the target pitch on an octave-by-octave basis such that the target pitch falls within the predetermined range from the acquired pitch.

Further, in one embodiment of the invention, the pitch detection section may detect, as the pitch of the representative portion, the highest pitch in a portion of the received voice signal where volume is of a predetermined value or over. The determination as to whether the volume is of the predetermined value or over may be made with a hysteresis characteristic, and/or with an additional condition that some pitch is detectable by the pitch detection section.

The present invention may be constructed and implemented not only as the apparatus invention discussed above but also as a method invention. Also, the present invention may be arranged and implemented as a software program for execution by a processor, such as a computer or a DSP (digital signal processor), as well as a non-transitory computer-readable storage medium storing such a software program. In such a case, the program may be supplied to the user in the form of the storage medium and then installed into a computer of the user, or alternatively delivered from a server apparatus to a computer of a client via a communication network and then installed into the computer of the client. Further, the processor employed in the present invention may be a dedicated processor provided with a dedicated hardware logic circuit rather than being limited only to a computer or other general-purpose processor capable of running a desired software program.

BRIEF DESCRIPTION OF DRAWINGS

Certain preferred embodiments of the present invention will hereinafter be described in detail, by way of example only, with reference to the accompanying drawings.

FIG. 6 is a diagram showing a main part of processing in the first example of application.

FIG. 7 is a diagram showing a main part of processing in the second example of application.

DETAILED DESCRIPTION

Figure 1:
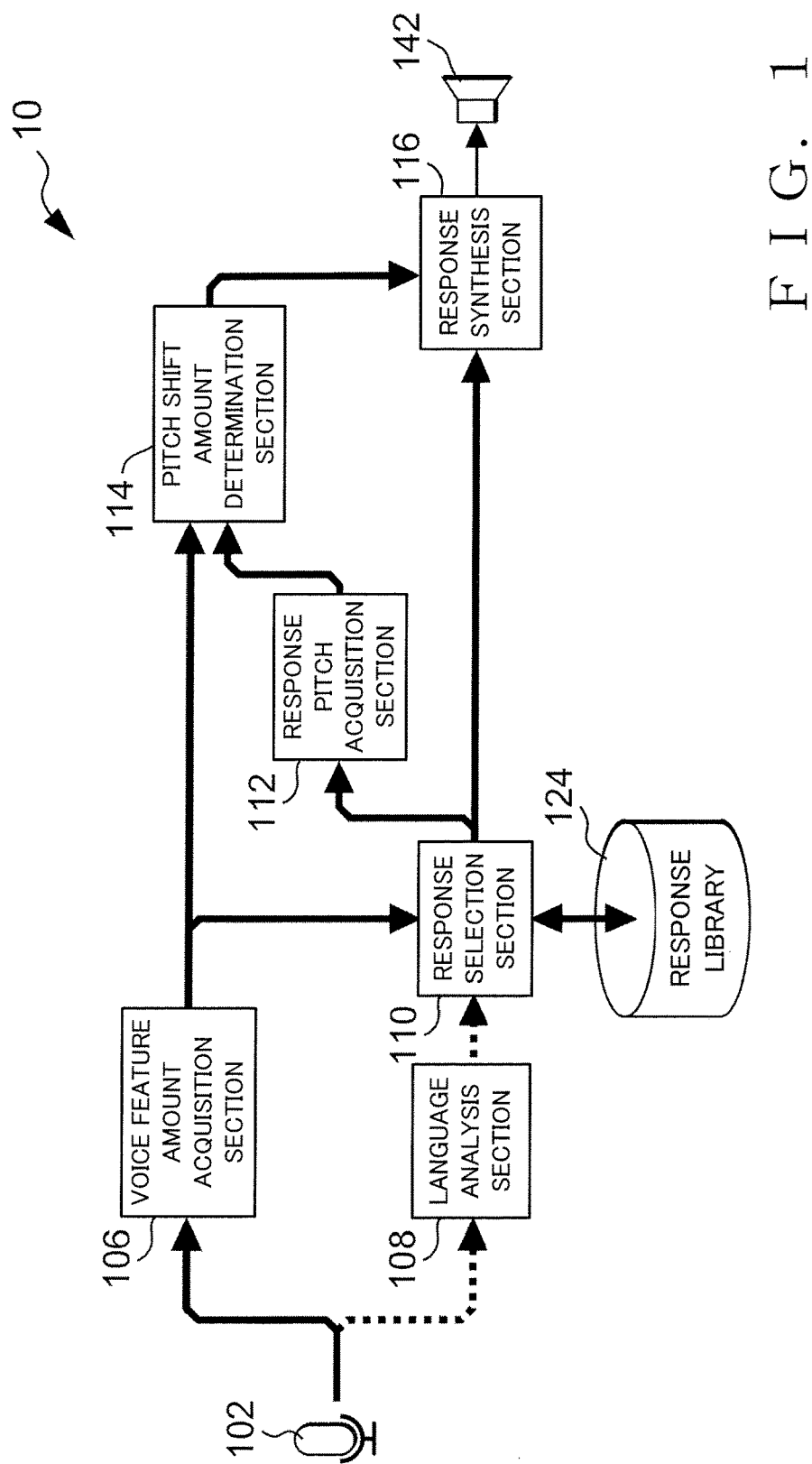
FIG. 1 is a block diagram showing a speech synthesis device according to an embodiment of the present invention.

FIG. 1 is a diagram showing a speech synthesis device 10 according to an embodiment of the present invention. The speech synthesis device 10 is incorporated in a stuffed doll or toy and configured in such a manner that, when a human speaker (user) has uttered a question to the stuffed toy, it automatically synthesizes and outputs a response, such as backchannel feedback, to the question. The speech synthesis device 10 includes a CPU (Central Processing Unit), a voice reception section 102, a speaker 142, etc., and a plurality of functional blocks are built as follows by the CPU executing a pre-installed application program. Namely, in the speech synthesis device 10 are built a voice feature amount acquisition section 106, a response selection section 110, a response pitch acquisition section 112, a pitch shift amount determination section 114 and a response synthesis section 116.

Although not particularly shown in the accompanying drawings, the speech synthesis device 10 also includes a display section, an operation input section, etc. so that an administrator or user can check various states of the speech synthesis device, input various operations to the speech synthesis device, make various settings, etc. Further, the speech synthesis device 10 may be applied to a so-called pet robot, a terminal device like a portable phone, a tablet-type personal computer, or the like rather than being incorporated in a toy like a stuffed toy.

The voice reception section 102 includes a microphone that receives a voice signal indicative of voice uttered by a human speaker (user) and converts the voice signal into an electric signal, and an A/D converter section that converts the converted voice signal into a digital signal.

The voice feature amount acquisition section (pitch detection section) 106 performs an analysis process on the voice signal (converted digital voice signal), received by the voice reception section 102, to divide the voice signal into an utterance section and a non-utterance section. Also, the voice feature amount acquisition section 106 detects a pitch of a particular portion of a voiced section of the utterance section and then supplies data indicative of the detected pitch to the response selection section 110 and the pitch shift amount determination section 114. Here, the term "utterance section" refers, for example, to a section where volume of the voice signal is of a predetermined threshold value or over, while the term "non-utterance section" refers to a section where the volume of the voice signal is of less than the predetermined threshold value. Further, the term "voiced section" refers to a portion of the utterance section where a pitch of the voice signal is detectable. Such a pitch-detectable section means that the voice signal has a cyclic portion and this cyclic portion is detectable.

The particular portion for which the pitch of the received voice signal is to be detected by the voice feature amount acquisition section 106 is a representative portion of the utterance indicated by the voice signal. Such a particular portion (representative portion) may be either the whole or a part of the utterance section as long as it represents a feature of the utterance (e.g., question). In the illustrated example, for instance, a trailing end portion in the utterance section of the received voice signal is set as the particular portion (representative portion), and the highest pitch in the trailing end portion is detected as the pitch to be detected. As an example, the trailing end portion is a portion between an end point and a time point preceding the end point by a predetermined time (e.g., 180 msec), i.e. a predetermined time width (e.g., 180-msec width) preceding the end point of the voiced section. For the voiced section, the volume of the voice signal may be determined using two (or three or more) threshold values, as will be later described. Further, the lowest pitch, average pitch or the like, other than the highest pitch, in the particular portion (representative portion) may be detected.

The response library 124 prestores a plurality of voice data of various responses to various utterances (e.g., questions) given by the user. Such voice data of responses (i.e., response voice data), which are recordings of voice of a suitable model person, may comprise a plurality of types of response patterns, such as ordinary or typical answers and backchannel feedback, such as "yes", "no", "uh-huh", well . . . " and "I see", that are responsive to questions. The voice data of responses (response voice data) are stored in a suitable format, such as the way or mp3. More specifically, for each of the responses, a pitch is detected per cycle or per plurality of cycles of a waveform of the response when reproduced in a standard manner, an average of these pitches is determined in advance, and data indicative of the average pitch (i.e., pitch based on the response) is prestored in the response library 124 in association with the voice data. Note that "the voice data is reproduced in a standard manner" means reproducing the voice data under the same condition (i.e., at the same sampling frequency) as when the voice data was recorded.

Once the data indicative of the average pitch is output from the voice feature amount acquisition section 106, the response selection section (response acquisition section) 110 selects from the response library 124 the voice data of one response to the received voice (utterance) and reads out and outputs the voice data of the selected response together with the associated data indicative of the average pitch. The response selection section 110 may select voice data of one response (i.e., one response voice data) from among the plurality of voice data in accordance with any desired rule; for example, the response selection section 110 may select one response voice data in a random manner or select one response voice data whose average pitch is closest to the pitch of the representative portion of the utterance (question). In such a case, although semantic content of the utterance (question) uttered by the user is not reflected in the selected response in the instant embodiment, only selecting the response without reflecting the semantic content of the utterance (question) suffices if the speech synthesis device 10 is regarded as a device that returns mere backchannel feedback or the like as a response to the question uttered by the user. Alternatively, however, a language analysis section 108 may be provided so that the language analysis section 108 analyzes the semantic content of the utterance (e.g., question) indicated by the received voice signal and then selects or creates a response suitable for the semantic content of the utterance (e.g., question) as depicted in broken line in FIG. 1.

The response pitch acquisition section 112 is configured to acquire a pitch (representative pitch) based on the acquired response voice data. As an example, the response pitch acquisition section 112 extracts the data indicative of the average pitch of the response from the data read out by the response selection section 110 and acquires the extracted data as the pitch (representative pitch) based on the acquired response voice data. The data indicative of the average pitch of the response acquired by the response pitch acquisition section 112 is supplied to the pitch shift amount determination section 114.

The pitch shift amount determination section 114 determines a pitch shift amount for shifting the pitch (average pitch of the response) acquired by the response pitch acquisition section 112 to a target pitch having a particular relationship to the pitch of the representative portion. In a preferred implementation, the pitch shift amount determination section 114 determines the target pitch such that the target pitch falls within a predetermined range from the acquired pitch (average pitch of the response). Namely, the pitch shift amount determination section 114 determines a pitch shift amount for controlling a pitch at which the voice data of the response (response voice data) is to be reproduced, on the basis of a difference between the pitch of the representative portion in the voice signal output from the voice feature amount acquisition section 106 and the average pitch of the response output from the response pitch acquisition section 112 and in a manner to be described later.

The response synthesis section 116 reproduces (synthesizes) the voice of the response on the basis of the response voice data read out from the response library 124, during which time the response synthesis section 116 shifts, in accordance with the pitch shift amount determined by the pitch shift amount determination section 114, the pitch of the voice of the response to be reproduced (synthesized). Note that the response voice signal with the pitch shifted as above is converted into an analog signal by a not-shown D/A converter section and then audibly generated by the speaker 142.

Note that the pitch (representative pitch) based on the response voice data acquired by the response pitch acquisition section 112 is not necessarily limited to the average pitch of the response and may be any other suitable pitch, such as an intermediate value of pitches of the response voice data or an average pitch in a predetermined portion of the response voice data. As an example, such an intermediate value or an average pitch in a predetermined portion of the response voice data may be prestored in the response library 124 in association with the corresponding response voice data and may be used by the pitch shift amount determination section 114 for determining the pitch shift amount.

Figure 2:
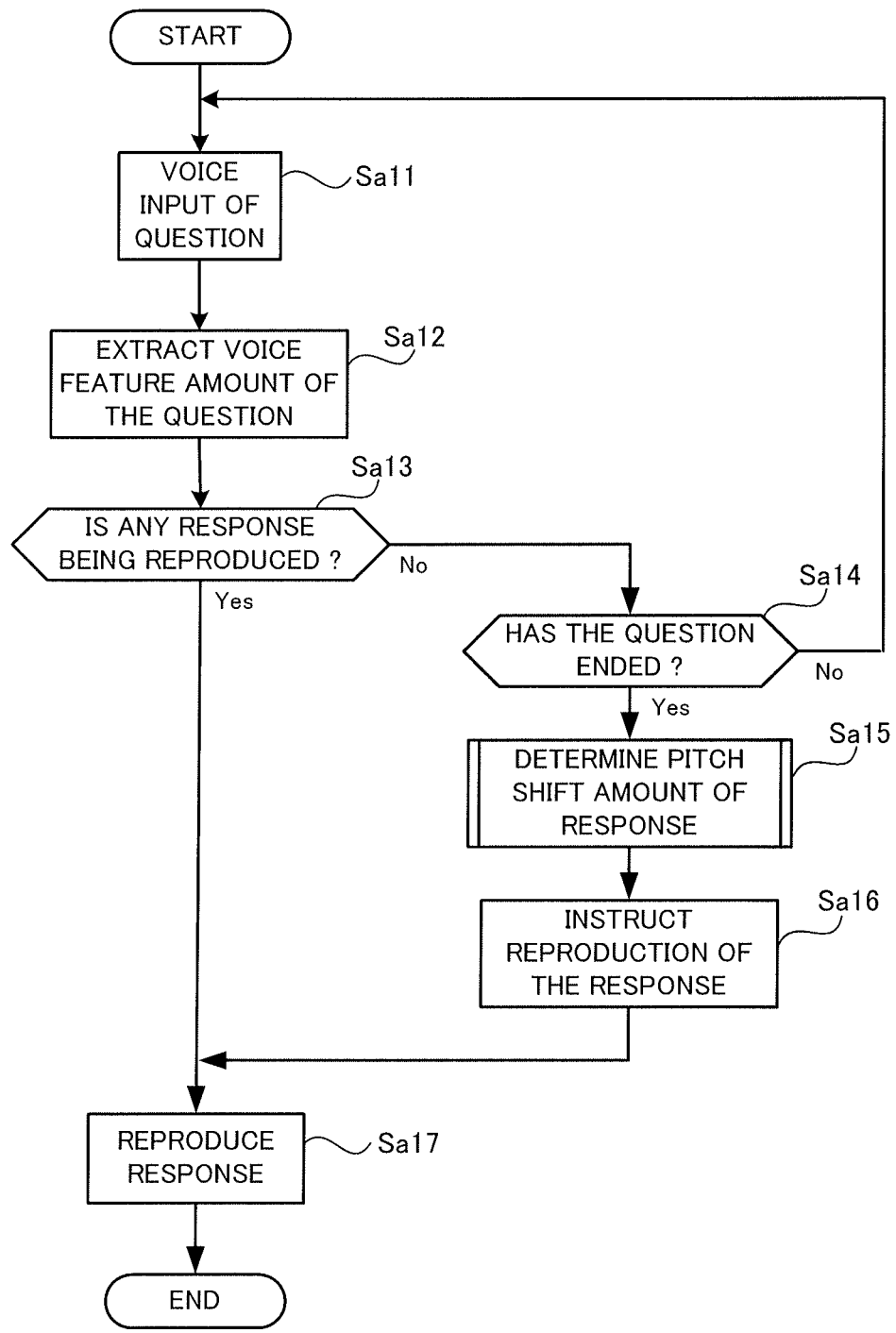
FIG. 2 is a flow chart showing operation of the speech synthesis device.

Next, a description will be given about operation of the speech synthesis device 10. FIG. 2 is a flow chart showing an example operational sequence of the speech synthesis device 10. The operational sequence shown by the flow chart is started up in response to the user uttering a question in voice to the stuffed toy having the speech synthesis device 10 applied thereto. For convenience, the operational sequence will be described hereinbelow in relation to a case where response voice data responsive to the user's uttered voice (question) is of a relatively high pitch.

First, at step Sa11, a voice signal received by the voice reception section 102 is supplied to the voice feature amount acquisition section 106. Then, at step Sa12, the voice feature amount acquisition section 106 performs the analysis process on the voice signal supplied from the voice reception section 102, i.e. performs the process for detecting a pitch of the representative portion of the user's uttered voice (question). At step Sa13, a determination is made as to whether any response is currently being reproduced by the response synthesis section 116.

If no response is currently being reproduced by the response synthesis section 116 as determined at step Sa13 (i.e., with a "No" determination at step Sa13), the voice feature amount acquisition section 106 further determines at step Sa14 whether the question (utterance) indicated by the voice signal received from the voice reception section 102 has ended. More specifically, whether the question (utterance) indicated by the voice signal received from the voice reception section 102 has ended is determined by determining whether a state where the volume of the voice signal is less than a predetermined threshold value has lasted for a predetermined time.

If the question has not yet ended (i.e., with a "No" determination at step Sa14), the operational sequence revers to step Sa11, so that the voice feature amount acquisition section 106 continues performing the analysis process on the voice signal supplied from the voice reception section 102.

If the question has ended (i.e., with a "Yes" determination at step Sa14), on the other hand, the pitch shift amount determination section 114 determines at step Sa15 a pitch shift amount to be used for reproducing the response voice data, selected by the response selection section 110, in the following manner.

Then, the pitch shift amount determination section 114 informs the response synthesis section 116 of the determined pitch shift amount and instructs at step Sa16 the response synthesis section 116 to reproduce the response voice data selected by the response selection section 110. In accordance with such an instruction given by the pitch shift amount determination section 114, the response synthesis section 116 reproduces the response voice data with the pitch shifted by the pitch shift amount determined by the pitch shift amount determination section 114, at step Sa17.

Note that step Sa13 determines that any response is currently being reproduced by the response synthesis section 116 (i.e., a "Yes" determination is made at step Sa13), for example, when a next question has been uttered by the user while one response is being reproduced in response to a given question. In such a case, the operational sequence proceeds to step Sa17 instead of taking a path of steps Sa14 and Sa11, and thus, the reproduction of the response is given priority.

Figure 3:
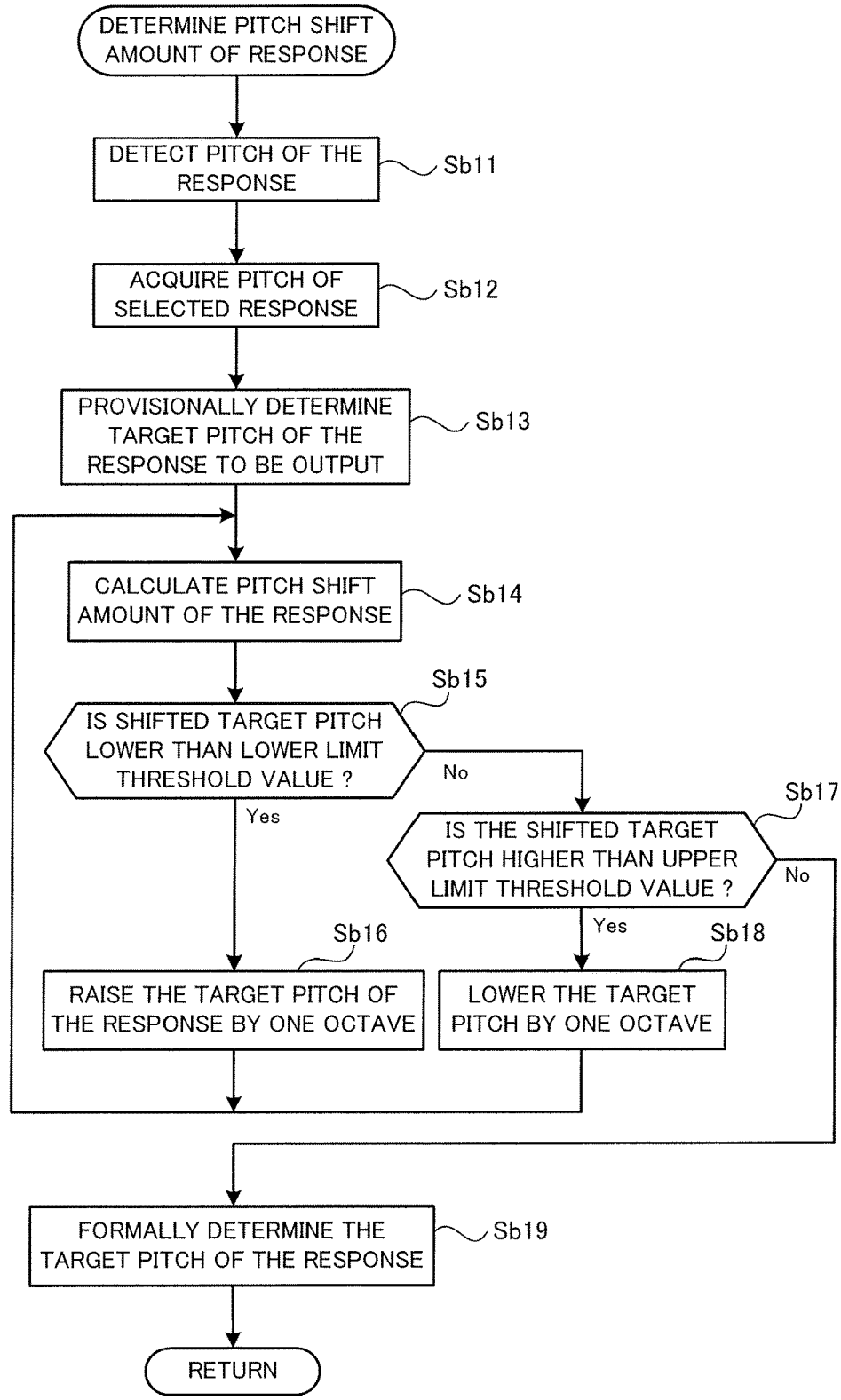
FIG. 3 is a flow chart showing operation of the speech synthesis device.

Further, FIG. 3 is a flow chart showing details of the process of step Sa15 in FIG. 2, i.e. the process for determining a pitch shift amount of the response voice data. Note that a precondition for this pitch shift amount determination process to be performed is that the response synthesis section 116 is not currently reproducing any response ("No" determination at step Sa13) but also the input of the question has been ended by the user ("Yes" determination at step Sa14). First, in the pitch shift amount determination process, a pitch of the representative portion of the question (utterance) uttered by the user is detected by the response synthesis section 116 at step Sb11.

The response selection section 110 selects from the response library 124 voice data of a selected response (selected response voice data) to the question uttered by the user and reads out the selected response voice data and the data indicative of the average pitch associated with the selected response voice data. Then, the response pitch acquisition section 112 acquires, from among the read-out data, the data indicative of the average pitch as the pitch (representative pitch) based on the selected response voice data, at step Sb12.

Then, at step Sb13, the pitch shift amount determination section 114 provisionally determines, as a target pitch at which the response to the question (utterance) is to be made with the selected response voice data, a pitch having a predetermined relationship to (e.g., five semitones lower than) the pitch of the representative portion of the question (utterance) detected by the voice feature amount acquisition section 106 at step Sb11.

Then, at step Sb14, the pitch shift amount determination section 114 calculates a pitch shift amount from the average pitch of the response, acquired by the response pitch acquisition section 112, to the target pitch provisionally determined at step Sb13 (or to a pitch changed at later-described step Sb16 or Sb18). Then, at step Sb15, the pitch shift amount determination section 114 determines whether or not the target pitch having been calculated by shifting the average pitch of the response by the pitch shift amount (i.e., shifted target pitch) is lower than a lower limit threshold value. Here, the lower limit threshold value is a threshold value indicating up to which pitch lower than the average pitch of the response is permitted, as will be detailed later.

If the shifted target pitch is lower than the lower limit threshold value (i.e., with a "Yes" determination at step Sb15), the pitch shift amount determination section 114 raises the provisionally determined target pitch of the response by one octave and provisionally determines such a one-octave-raised pitch as the target pitch at which the response is to be made with the voice data, at step Sb16. After that, the operational sequence revers to step Sb14, so that a pitch shift amount is calculated again and then the determinations at steps Sb15 and Sb17 are made again.

If the shifted target pitch is not lower than the lower limit threshold value (i.e., with a "No" determination at step Sb15), the pitch shift amount determination section 114 further determines at step Sb17 whether the shifted target pitch is higher than an upper limit threshold value. Here, the upper limit threshold value is a threshold value indicating up to which pitch higher than the average pitch of the response is permitted, as will be detailed later.

If the shifted target pitch is higher than the upper limit threshold value as determined at step Sb17 (i.e., with a "Yes" determination at step Sb17), the pitch shift amount determination section 114 lowers the provisionally determined target pitch of the response by one octave and provisionally determines such a one-octave-lowered pitch as the target pitch at which the response is to be made with the voice data, at step Sb18. After that, the operational sequence revers to step Sb14, so that a pitch shift amount is calculated again and then the determinations at steps Sb15 and Sb17 are made.

If the shifted target pitch is not higher than the upper limit threshold value (i.e., with a "No" determination at step Sb17), it means that the shifted target pitch falls within a predetermined pitch range equal to and higher than the lower limit threshold value and equal to and lower than the upper limit threshold value. Thus, the operational sequence proceeds to step Sb19, where the pitch shift amount determination section 114 formally determines the target pitch that is currently at the provisionally determined stage and then informs the response synthesis section 116 of a pitch shift amount corresponding to the formally determined target pitch.

Figure 4:
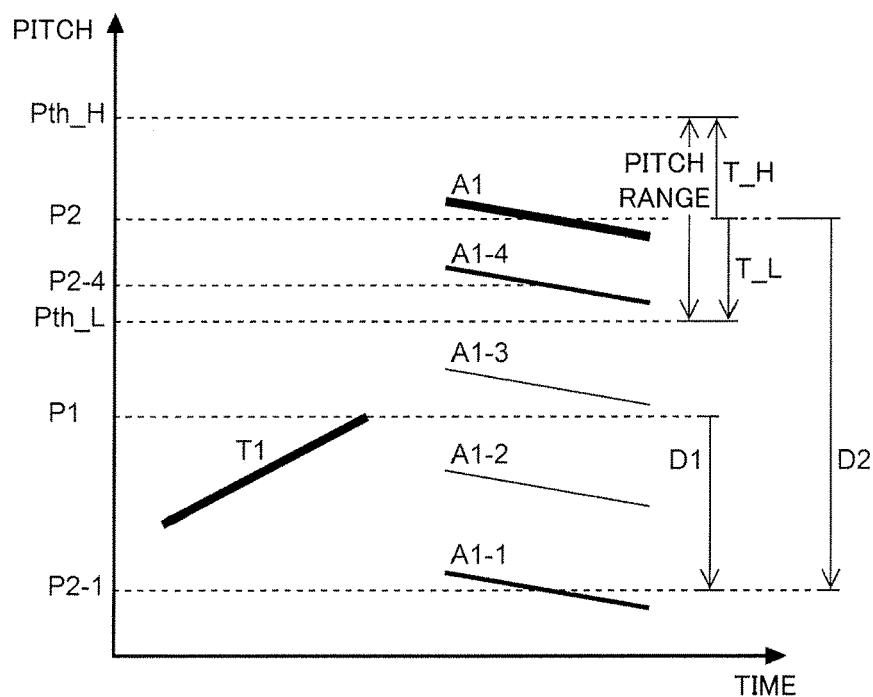
FIG. 4 is a diagram showing relationship in pitch between a question input by a user and responses synthesized by the speech synthesis device.

FIG. 4 is a diagram showing relationship between a question (utterance) in voice input by the user and responses to be synthesized by the speech synthesis device 10, where the vertical axis represents the pitch while the horizontal axis represents the time. In FIG. 4, a straight solid line indicated by reference character T1 schematically shows a pitch variation in the question uttered by the user. Reference character P1 indicates a pitch of the particular portion of the question T1. Further, a solid line indicated by reference character A1 schematically shows a pitch variation when response voice data selected in response to the question T1 is reproduced in the standard manner. Reference character P2 indicates an average pitch in the pitch variation.

If the response A1 is reproduced in response to the question T1 without the pitch of the response A1 being shifted, a mechanical feeling tends to be given. Therefore, as a first means, the instant embodiment is configured to reproduce a response A1-1 obtained by shifting the pitch of the response A1 to a pitch P2-1 that has a consonant-interval relationship to, e.g. five semitones lower than, the pitch P1 of the representative portion (ending of word) that is a characteristic and impressing portion of the question T1. Reference character D1 in FIG. 4 indicates a difference between the pitch P1 and the pitch P2-1. However, if the pitch shift amount D2 of the response A1-1 relative to the response A1 is too great, auditory quality of the pitch-shifted response A1-1 would deteriorate when the response A1-1 is reproduced. Particularly, when there is a great difference between the pitch of the particular portion of the question and the average pitch of the response (for example, when the user uttering the question is a male while the model responding to the question is a female), and if the response A1-1 is reproduced after being shifted in pitch in a pitch lowering direction, the response A-1 tends to become unnatural and markedly deteriorate in quality.

Thus, as a second means, the instant embodiment is constructed to shift the pitch P2-1 of the response A1-1 stepwise on an octave-by-octave basis until the pitch P2-1 falls within a predetermined range from the average pitch P2 of the original response A1 while maintaining the target pitch of the response, which is to be synthesized by the response synthesis section 116, in a particular relationship to the pitch P1. In the illustrated example of FIG. 4, a response A1-4 is an example having been raised in pitch by three octaves from the response A1-1 by way of a response A1-2 and a response A1-3 until the pitch falls within a predetermined pitch range based on the average pitch P2 of the response A1.

Of the pitch ranges set based on the average pitch P2 of the response A1 in FIG. 4, a pitch difference from the average pitch P2 to a lower limit threshold value Pth_L is indicated by a reference character T_L, and a pitch difference from the average pitch P2 to an upper limit threshold value Pth_H is indicated by a reference character T_H. The lower limit threshold value Pth_L is a relative value defined by the pitch difference T_L based on the average pitch P2 of the response A1, and similarly, the upper limit threshold value Pth_H is a relative value defined by the pitch difference T_H based on the average pitch P2 of the response A1. Because voice data of a plurality of responses (a plurality of response voice data) are prestored in the response library 124, the lower limit threshold value Pth_L and the upper limit threshold value Pth_H differ for each of the responses. However, defining the lower limit threshold value Pth_L and the upper limit threshold value Pth_H relatively as pitch difference values based on the average pitch P2 as noted above can avoid a need for prestoring the lower limit threshold value Pth_L and the upper limit threshold value Pth_H in association with each of the response voice data.

Note that the pitch P2-1 is in a consonant-interval relationship to the pitch P1 of the question T1 and the pitch P2-4 is three octaves higher than the pitch P2-1. Therefore, the frequency of the pitch P2-4 and the frequency of the pitch P2-1 are maintained in an integral-ratio relationship to each other, and thus, the pitch P1 and the pitch P2-4 are maintained in a substantial consonant-interval relationship to each other.

Sometimes, the response A1-2, for example, might be formally determined and then reproduced. However, because the response A1-2, obtained by merely shifting the pitch of the response A1-1 one octave higher, has a great pitch shift amount from the original response A1, the response A1-2 tends to become unnatural and present unignorable deterioration of auditory quality. Thus, in the instant embodiment, control is performed such that the pitch of the response falls within a predetermined pitch range as set forth above.

According to the instant embodiment constructed in the aforementioned manner, it is possible to synthesize (reproduce) a response to a question uttered by the user which is not mechanical and has no unnatural speaking tone, while avoiding deterioration of auditory quality. In addition, the instant embodiment can eliminate a need for imparting the voice data of the response with attribute information indicating whether the response voice is of a female or of a male and determining a pitch shift amount in accordance with such attribute information.

Figure 5:
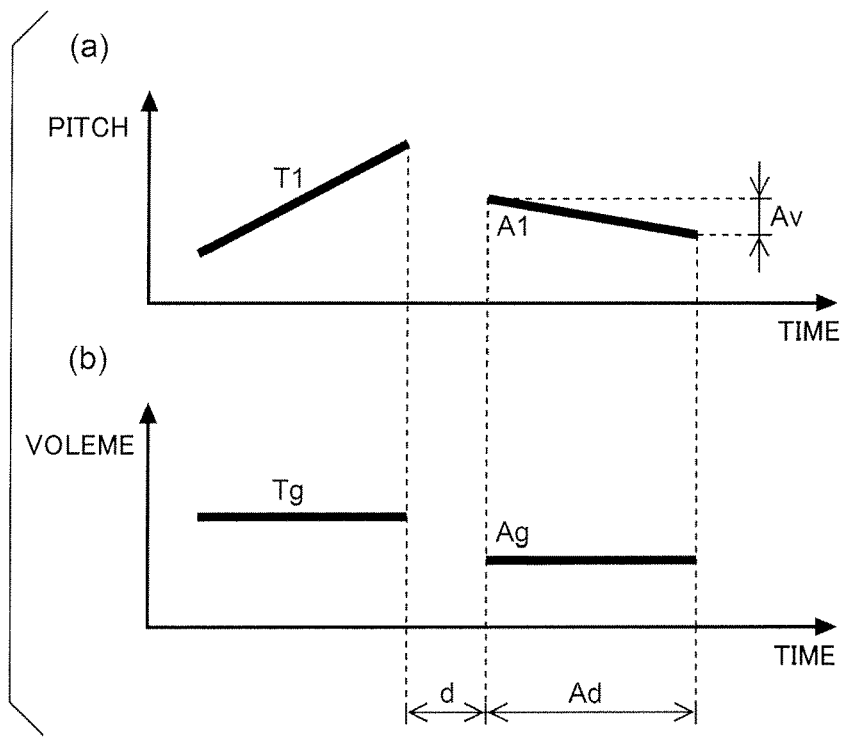
FIG. 5 is a diagram explanatory of various premises concerning examples of application.

Further, with the instant embodiment constructed in the aforementioned manner, it is possible to synthesize responses imparted with various feelings, such as an angry response and a lukewarm response, in manners as illustrated below. FIG. 5 is a diagram explanatory of the following terms. The horizontal axis in (a) and (b) of FIG. 5 represents the time, the vertical axis in (a) of FIG. 5 represents the pitch, and the vertical axis in (b) of FIG. 5 represents the volume. In the figure, reference character Av indicates a pitch variation width of the response A1, reference character d indicates a time interval from the end of the question T1 to a time point when reproduction of the response A1 is started, and reference character Ad indicates a time length or duration of reproduction of the response A1. Further, reference character Tg indicates a volume variation over time of the question T1, and reference character Ag indicates a volume variation over time of the response A1.

In a first example of application shown in FIG. 6, the response A1 is reproduced at an increased speed as depicted by a response A11, and a time interval d11 from the end of the question T1 to a time point when reproduction of the response A11 is started is made shorter than the abovementioned time interval d, and volume Ag11 of the response A11 is made greater than the above-mentioned volume Ag. In this manner, a response expressive of anger can be output. Because the reproduction speed of the response A11 is increased as compared to that of the response A1, the response A11 has a reproduction time length Ad11 shorter than the reproduction time length Ad of the response A1.

Further, in a second example of application shown in FIG. 7, the response A1 is reproduced at a reduced speed as depicted by a response A12, and a time interval d12 from the end of the question T1 to a time point when reproduction of the response A12 is started is made longer than the abovementioned time interval d, and volume Ag12 of the response A12 is made smaller than the above-mentioned volume Ag. In this manner, a response expressive of a lukewarm feeling can be output. Because the reproduction speed of the response A12 is reduced as compared to that of the response A1, the response A12 has a reproduction time length Ad12 longer than the reproduction time length Ad of the response A1.

Figure 8:
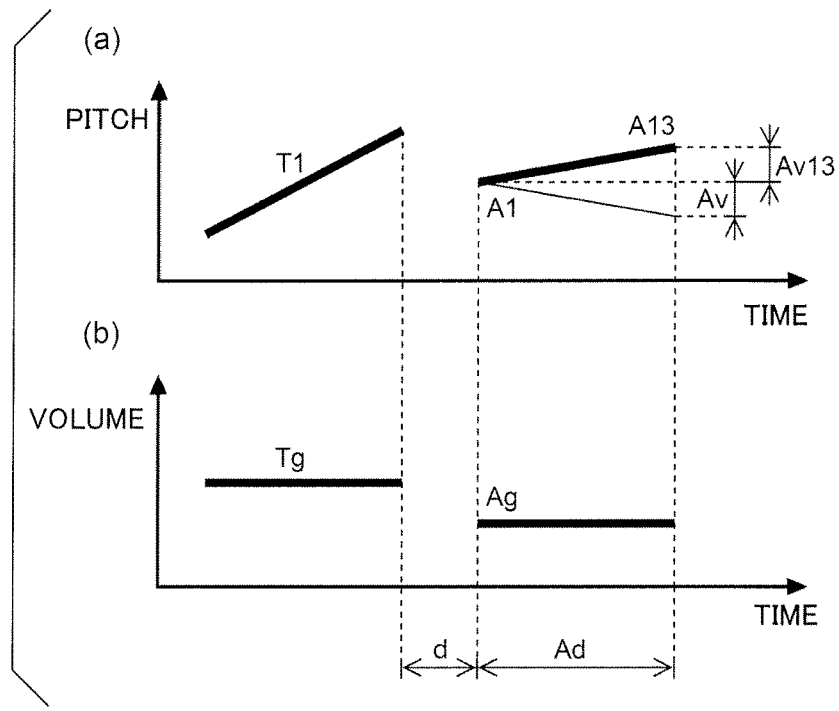
FIG. 8 is a diagram showing a main part of processing in the third example of application.

Furthermore, in a third example of application shown in FIG. 8, the response A1 is reproduced in such a manner that the pitch increases or rises toward the response end as depicted by a response A13; namely, the response A13 is reproduced in such a manner that the pitch increases by a pitch variation width Av13. In this manner, a response as if giving a counter-question to the user's utterance (question) can be output.

The instant embodiment may be constructed in such a manner that, in synthesizing a response with some feeling as noted above, the user is allowed to set, via the above-mentioned operation input section, a pitch variation width (e.g., in the pitch raising/lowering direction) of a response to the question T1, a time interval from the end of the response T1 to the start of reproduction of the response, reproduction volume of the response, reproduction speed of the response, etc. Further, the instant embodiment may be constructed so as to allow the user to select a desired one of various types of responses, such as an angry response, a lukewarm response and a response as if giving a counter-question.

Figure 9:
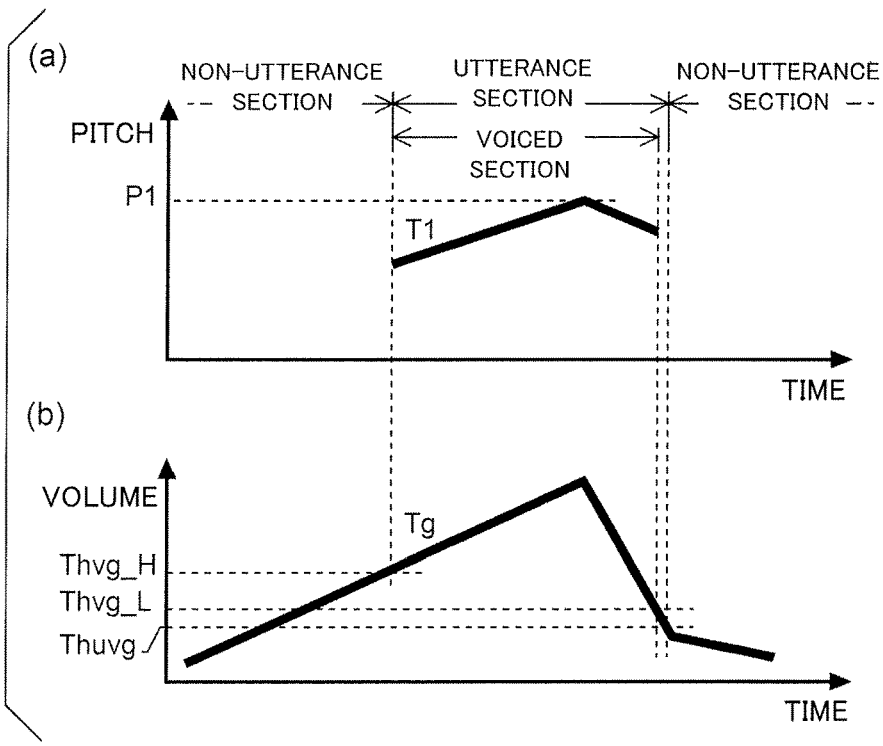
FIG. 9 is a diagram showing a main part of processing in the fourth example of application.

Further, an utterance section, a voiced section, etc. may be detected from the voice signal of the utterance (question) uttered by the user in the following manner. FIG. 9 is a diagram showing relationship between the detection of an utterance section, a non-utterance section and a voiced section and threshold values of volume in a fourth example of application. In this figure, a pitch variation over time of the user's utterance (question) is shown in (a), while a volume variation over time is shown in (b). More specifically, FIG. 9 shows that the pitch and the volume first increase gradually and then turn downward.

Here, the threshold value Thvg_H is applied when the pitch is detectable from the voice signal of the user's question and the volume of the user's question is in the increasing direction, and the start of an utterance section and a voiced section is detected when the volume has increased to the threshold value Thvg_H or over. The threshold value Thvg_L is applied when the pitch is detectable from the voice signal of the user's question and the volume of the user's question is in the decreasing direction, and the end of a voiced section is detected when the volume has decreased below the threshold value Thvg_L.

In an actual utterance, there may occur swinging-back of volume even when the volume has decreased below the threshold value Thvg_L. Thus, in the instant illustrated example, a lower limit threshold value Thuvg with which a pitch of a voice signal of a question is detectable is provided, and the end of an utterance section (the start of a non-utterance section) is detected when the volume of the question is in the decreasing direction and has decreased below the threshold value Thvg_L and then below the lower limit threshold value Thuvg. Note that the threshold values Thvg_H, Thvg_L and Thuvg are in a relationship of Thvg_H>Thvg_L>Thuvg.

The highest pitch value in the voiced section detected with the threshold values Thvg_H and Thvg_L may be detected as the pitch of the representative portion in the utterance (question). It is assumable that noise would be picked up as a voice signal if the voiced section detected in this manner has a relatively short time length or duration. Therefore, a condition for detecting such a voiced section may be set such that a voiced section is detected when some pitch is detectable from the voice signal and the volume of the question is in the increasing direction and if a state where the volume, having reached the threshold value Thvg_H or over, remains at the threshold value Thvg_H or over has lasted for more than a predetermined time.

Further, it is also assumable that the user's utterance (question) has not yet ended if an unvoiced (silent) section has a relatively short time length or duration. Therefore, a condition for detecting such an unvoiced section may be set such that an unvoiced section is detected when some pitch is detectable from the voice signal and the volume of the question is in the decreasing direction and, if a state where the volume, having decreased below reached the threshold value Thvg_L, remains below the threshold value Thvg_L has lasted for more than a predetermined time. Needless to say, when an unvoiced section is detected based on the aforementioned condition that the state where the volume remains below the threshold value Thvg_L has lasted for more than the predetermined time following the detection of a voiced section based on the aforementioned condition that the state where the volume remains at the threshold value Thvg_H or over has lasted for more than the predetermined time, the highest pitch value in the preceding voiced section may be detected as the pitch of the particular portion in the question.

Further note that, if a trailing end portion of a voiced section set as the representative portion is unvoiced sound (i.e., sound involving no vibration of the vocal band) in an utterance (question) by the speaker (user), a pitch of the unvoiced sound portion may be estimated from a voiced sound portion preceding the unvoiced sound portion. Further note that, whereas the instant embodiment has been detected above as setting a trailing end portion of a voiced section as the representative portion of a speaker's (user's) utterance (question), the present invention is not so limited. The present invention may alternatively be constructed so as to allow the user to select as desired which portion of the utterance (question) should be set as the representative portion. As another alternative, only any one of volume and pitch, rather than both of volume and pitch, may be used for the voiced section detection, and which of volume and pitch should be used for the voiced section detection may be selected by the user.

As a modification, different types of response voice uttered by individual ones of a plurality of persons A, B, C, . . . for same or common content may be prestored as voice data of responses in the response library 124. For example, the persons A, B, C, . . . may be a famous person (celebrity), a talent, a singer, etc., and these response voice data may be prestored in the response library 124 in corresponding relation to such different persons. For storing the response voice data in corresponding relation to such different persons as noted above, the response voice data may be prestored into the response library 124 by way of a storage medium, such as a memory card, or alternatively, the speech synthesis device 10 may be equipped with a network connection function such that the response voice data can be downloaded from a particular server and stored into the response library 124. Further, the response voice data may be acquired either on a free-of-charge basis or on a paid basis. Further, arrangements may be made such that, in giving an utterance (question), the user can select, via the operation input section or the like, which of the persons should respond as a response voice model. Furthermore, arrangements may be made to determine a response voice model randomly for each of various different conditions (date, week, month, etc.).

As another modification, voices of the user itself and family members and acquaintances of the user recorded via the microphone of the voice reception section 102 (or converted into data via another device) may be prestored in the library. Thus, when a response is made in the voice of such a close person to an utterance (question) given by the user, the user can have a feeling as if having a dialogue with that close person.

As still another modification, the response voices may comprise crying voices of animals (such as a dog and a cat), and arrangements may be made to permit selection of a desired type of animal, such as a dog type or the like. With the response voices comprising crying voices of animals like this, a kind of healing effect as if the user were having a dialogue with a desired one of the animals can be obtained.

As still another modification, the response pitch acquisition section 112 may be configured to analyze the response voice data determined by the response selection section 110 to obtain the average pitch of the response voice data when reproduced in the standard manner and then supply data indicative of the average pitch to the pitch shift amount determination section 114. Such arrangements can eliminate a need for prestoring the pitch-indicative data, based on the response voice data, in association with the response voice data.

Whereas the embodiment of the invention has been described above in relation to the case where the pitch range of response voice data rises in response to the pitch of a speaker's (user's) utterance (question), the present invention is not so limited and may be constructed in such a manner that the pitch range of response voice data lowers in response to the pitch of a speaker's (user's) utterance (question). Further, whereas the embodiment of the invention has been described above in relation to the case where the speaker of an utterance received by the voice input section (reception section) 102 is the user, the speaker may be a third person or an automatic voice generator device. For example, voice spoken by the speaker may be one generated by a third person via a communication network or generated by another voice or speech synthesis device.

What is claimed is:

1. A speech synthesis device comprising:
a reception section that receives a voice signal of an utterance;
a pitch detection section that, based on the voice signal received by the reception section, detects a pitch of a representative portion which is a part of the utterance;
a response acquisition section that acquires voice data of a response to the utterance;
a response pitch acquisition section that acquires a pitch based on the voice data of the response acquired by the response acquisition section;
a pitch shift amount determination section that determines a pitch shift amount for shifting the pitch acquired by the response pitch acquisition section to a target pitch having a particular relationship to the pitch of the representative portion; and
a response synthesis section that synthesizes voice of the response based on the voice data of the response, the response synthesis section being configured to shift, in accordance with the shift amount, a pitch of the voice of the response to be synthesized.

2. The speech synthesis device as claimed in claim 1, wherein the pitch shift amount determination section determines the target pitch such that the target pitch falls within a predetermined range from the acquired pitch.

3. The speech synthesis device as claimed in claim 2, wherein the pitch shift amount determination section adjusts the target pitch on an octave-by-octave basis such that the target pitch falls within the predetermined range from the acquired pitch.

4. The speech synthesis device as claimed in claim 1, wherein the pitch detection section detects, as the pitch of the representative portion, a highest pitch in a portion of the received voice signal where volume is of a predetermined value or over.

5. The speech synthesis device as claimed in claim 1, wherein the pitch detection section detects, as the pitch of the representative portion, a pitch in a trailing end portion of the received voice signal.

6. The speech synthesis device as claimed in claim 1, wherein the pitch shift amount determination section determines, as the target pitch, a pitch having a consonant-interval relationship to the pitch of the representative portion.

7. The speech synthesis device as claimed in claim 6, wherein the pitch shift amount determination section determines, as the target pitch, a pitch that is five semitones lower than the pitch of the representative portion.

8. The speech synthesis device as claimed in claim 1, wherein the response synthesis section is configured to variably control a reproduction speed of the voice of the response to be synthesized.

9. The speech synthesis device as claimed in claim 1, wherein the response synthesis section is further configured to control over time volume of the voice of the response to be synthesized.

10. The speech synthesis device as claimed in claim 1, wherein the response synthesis section is further configured to control over time the pitch of the voice of the response to be synthesized.

11. The speech synthesis device as claimed in claim 1, wherein a trailing end portion of the utterance of the received voice signal is set as the representative portion.

12. The speech synthesis device as claimed in claim 11, wherein a highest pitch in the trailing end portion is the pitch to be detected by the pitch detection section.

13. The speech synthesis device as claimed in claim 11, wherein the trailing end portion is a portion between an end point and a time point preceding the end point by a predetermined time.

14. The speech synthesis device as claimed in claim 1, wherein the representative portion is a portion of the utterance where the pitch of the utterance impresses listeners more than other portions of the utterance.

15. The speech synthesis device as claimed in claim 1, wherein the pitch acquired by the response pitch acquisition section is an average pitch of the response.

16. A speech synthesis method comprising:
receiving a voice signal of an utterance;
detecting, based on the received voice signal, a pitch of a representative portion which is a part of the utterance;
acquiring voice data of a response to the utterance;
acquiring a pitch based on the acquired voice data of the response;
determining a pitch shift amount for shifting the acquired pitch to a target pitch having a particular relationship to the pitch of the representative portion; and synthesizing voice of the response based on the voice data of the response and with shifting, in accordance with the shift amount, a pitch of the voice of the response to be synthesized.

17. A non-transitory computer-readable storage medium storing a group of instructions executable by a processor for implementing a speech synthesis method, the speech synthesis method comprising:

receiving a voice signal of an utterance;

detecting, based on the received voice signal, a pitch of a representative portion which is a part of the utterance;

acquiring voice data of a response to the utterance;

acquiring a pitch based on the acquired voice data of the response;

determining a pitch shift amount for shifting the acquired pitch to a target pitch having a particular relationship to the pitch of the representative portion; and synthesizing voice of the response based on the voice data of the response and with shifting, in accordance with the shift amount, a pitch of the voice of the response to be synthesized.

* * * * *